US012213949B2

(12) United States Patent
Gall et al.

(10) Patent No.: US 12,213,949 B2
(45) Date of Patent: Feb. 4, 2025

(54) CAPSULE FILLING MACHINE FOR FILLING TWO-PART CAPSULES

(71) Applicant: Harro Hoefliger Verpackungsmaschinen GmbH, Allmersbach im Tal (DE)

(72) Inventors: Steffen Gall, Allmersbach im Tal (DE); Reiner Wurst, Allmersbach im Tal (DE); Florian Huhnen, Allmersbach im Tal (DE); Jonathan Cocks, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 167 days.

(21) Appl. No.: 17/932,730

(22) Filed: Sep. 16, 2022

(65) Prior Publication Data

US 2023/0093029 A1 Mar. 23, 2023

(30) Foreign Application Priority Data

Sep. 17, 2021 (EP) .................................... 21197553

(51) Int. Cl.
*A61J 3/07* (2006.01)

(52) U.S. Cl.
CPC .................................... *A61J 3/074* (2013.01)

(58) Field of Classification Search
CPC ...................................................... A61J 3/074
See application file for complete search history.

(56) References Cited

U.S. PATENT DOCUMENTS

2011/0088355 A1* 4/2011 Fulper ..................... A61J 3/074 53/111 R
2011/0146841 A1 6/2011 Ansaloni et al.
2019/0154529 A1* 5/2019 Schlipf ..................... G01L 1/00

FOREIGN PATENT DOCUMENTS

| | | | | |
|---|---|---|---|---|
| CN | 105342858 A | | 2/2016 | |
| DE | 20216953 U1 | * | 12/2002 | ............. A61J 3/074 |
| EP | 1 415 637 B | | 5/2004 | |
| EP | 2 135 810 B | | 12/2009 | |

OTHER PUBLICATIONS

Translation of DE-20216953-U1 (Year: 2002).*

* cited by examiner

*Primary Examiner* — Jason K Niesz
(74) *Attorney, Agent, or Firm* — Walter Ottesen, P.A.

(57) ABSTRACT

The disclosure relates to a capsule filling machine for filling two-part capsules each having an upper capsule portion and a lower capsule portion. The capsule filling machine includes a main drive unit for operating the capsule filling machine and at least one capsule segment for conveying the capsules. The capsule segment includes a lower segment portion for receiving the lower capsule portion and an upper segment portion for receiving the upper capsule portion. The lower segment portion and the upper segment portion are constructed to be able to be moved relative to each other. The capsule segment is operatively connected to the main drive unit in such a manner that the relative movement of the lower segment portion and upper segment portion with respect to each other is effected by the main drive unit.

8 Claims, 3 Drawing Sheets

CAPSULE FILLING MACHINE FOR FILLING TWO-PART CAPSULES

CROSS REFERENCE TO RELATED APPLICATION

This application claims priority of European patent application no. 21197553.7, filed Sep. 17, 2021, the entire content of which is incorporated herein by reference.

TECHNICAL FIELD

The disclosure relates to a capsule filling machine for filling two-part capsules.

BACKGROUND

Primarily in the pharmaceutical field, but also in the field of food supplements, capsules are used to administer metered quantities of a powdered, granulate-like or liquid preparation. The capsules include a hard gelatine or the like and dissolve after swallowing, as a result of which the content thereof is released.

In so-called hard capsules, there is first brought about on timed capsule filling machines a supply of empty capsules, which are positioned upright in capsule retainers and are then opened. The lower capsule portions are retained in a lower segment portion, the upper capsule portions are retained in an upper segment portion. The segment portions pivot apart after separation of the capsules so that the lower capsule portions are released for filling. Subsequently, in one or more metering stations the lower capsule portions which are open in an upward direction are filled with the provided preparation in a metered quantity. After the filling operation, the segment portions pivot together again so that the upper capsule portion and lower capsule portion are arranged so as to overlap each other. In a closure station, the lower capsule portions are then placed on the filled lower capsule portions again. The completely filled capsules which have been produced in this manner are ultimately removed from their capsule retainers in an ejection station and then supplied for further processing, in particular packaging.

Such capsule filling machines have several drive units. Accordingly, for example, a drive unit is provided to rotate the rotary table. Another drive unit serves to mutually pivot the upper segment portions and the lower segment portions. A disadvantage of such capsule filling machines involves the complex machine construction and the associated, more difficult synchronisation of the movement sequences of the segment portions.

SUMMARY

It is an object of the disclosure to provide a capsule filling machine which has a simplified machine technology and which at the same time enables an operationally reliable filling of capsules.

This object can, for example, be achieved via a capsule filling machine for filling two-part capsules each having an upper capsule portion and a lower capsule portion. The capsule filling machine includes: a main drive unit for operating the capsule filling machine; at least one capsule segment for conveying the capsules; the capsule segment including a lower segment portion configured to receive the lower capsule portion and an upper segment portion configured to receive the upper capsule portion; the lower segment portion and the upper segment portion being configured to be moveable relative to each other; and, the capsule segment being operatively connected to the main drive unit such that a relative movement of the lower segment portion and the upper segment portion with respect to each other is effected by the main drive unit.

A capsule filling machine according to the disclosure is used to fill two-part capsules each having an upper capsule portion and a lower capsule portion. The capsule filling machine includes a main drive unit for operating the capsule filling machine and at least one capsule segment for conveying the capsules. The capsule segment includes a lower segment portion for receiving the lower capsule portion and an upper segment portion for receiving the upper capsule portion. The lower segment portion and the upper segment portion are constructed to be able to be moved relative to each other. The capsule segment is operationally connected to the main drive unit in such a manner that the relative movement of the lower segment portion and upper segment portion with respect to each other is brought about by the main drive unit.

The capsule filling machine accordingly has a single drive unit [with] which serves both to operate the capsule filling machine and to carry out the relative movement of the upper segment portion and lower segment portion relative to each other. Additional drive units which serve to move the segment portions can thereby be dispensed with. As a result of saving additional drive units, the construction of the capsule filling machine can be simplified. Furthermore, the relative movement of the lower segment portion and upper segment portion is forcibly coupled kinematically to the main drive unit. A synchronisation of the movement sequences of the segment portions with respect to each other and with the individual process stations can thereby be ensured.

There can advantageously be provision for the relative movement to include a pivot movement about a pivot axis of the capsule segment and a translational movement in the direction of the pivot axis. If the upper segment portion and lower segment portion overlap, they are preferably first moved apart in the direction of the pivot axis. In other words, the upper segment portion and lower segment portion move apart in translation. Consequently, a spacing between the two segment portions is adjusted, whereby a collision of the segment portions during pivoting can be prevented. If the spacing between the segment portions is sufficiently large, therefore, the segment portions are subsequently pivoted towards each other. The segment portions are intended to be pivoted apart from each other in such a manner that the lower segment portion is accessible for the corresponding metering devices and they can fill the lower capsule portions which have been received in the lower segment portion. After the filling operation of the lower capsule portions, the segment portions are pivoted back again until the upper capsule portion and the lower capsule portion overlap. Subsequently, the upper capsule portion and the lower capsule portion can be closed with each other.

Preferably, the upper segment portion can be pivotably driven about the pivot axis via the main drive unit. Preferably, the upper segment portion can be driven via the main drive unit so as to be able to be moved in translation along the pivot axis of the capsule segment. In an embodiment of the capsule filling machine, only the upper segment portion has the above-described degrees of pivoting freedom and/or the degrees of translational movement freedom. It may also be advantageous that both the lower segment portion and the upper segment portion have the degrees of pivoting freedom and/or the degrees of translational movement freedom.

Preferably, the capsule filling machine can include a rotary table, wherein the rotary table can be rotatingly driven via the main drive unit about a rotation axis of the rotary table. Both the lower segment portion and the upper segment portion are arranged on the rotary table. If the above-described degrees of freedom are provided only for the upper segment portion, the lower segment portion is securely connected to the rotary table. In other words, the lower segment portion is securely fixed to the rotary table. This affords the advantage that a rotational movement of the lower segment portion is brought about only by the rotational movement of the rotary table. An additional rotational movement by the lower segment portion with respect to the rotary table itself is not possible. Accordingly, the angle speeds of the lower segment portion are small, whereby a soiling of open lower portion capsules with filling material can be prevented or at least reduced.

There can advantageously be provision for a first slotted guiding member to be provided, wherein the first slotted guiding member together with the main drive unit brings about the translational movement of the capsule segment. Preferably, a second slotted guiding member can be provided, wherein the second slotted guiding member together with the main drive unit brings about the pivot movement of the capsule segment. The first slotted guiding member and the second slotted guiding member can preferably be formed on a fixed housing portion of the capsule filling machine. The rotary table is rotatingly driven about the rotation axis thereof with respect to the fixed housing portion via the main drive unit. The capsule segment can preferably be arranged on the rotary table, whereby the capsule segment is also subjected to a rotational movement. The capsule segment has in particular a guiding arm, wherein the guiding arm includes a first connecting link element and a second connecting link element, wherein the first connecting link element cooperates with the first slotted guiding member and the second connecting link element cooperates with the second slotted guiding member. As a result of the cooperation of the slotted guiding members and connecting link elements, the rotational movement which is transmitted from the main drive unit via the rotary table to the capsule segment is transferred into the above-described pivot movement and the translation movement of the capsule segment. As a result, an additional drive unit for the capsule segment can be dispensed with and a simple construction of the capsule filling machine can be ensured.

BRIEF DESCRIPTION OF THE DRAWINGS

The invention will now be described with reference to the drawings wherein.

DESCRIPTION OF THE PREFERRED EMBODIMENTS

Figure 1:
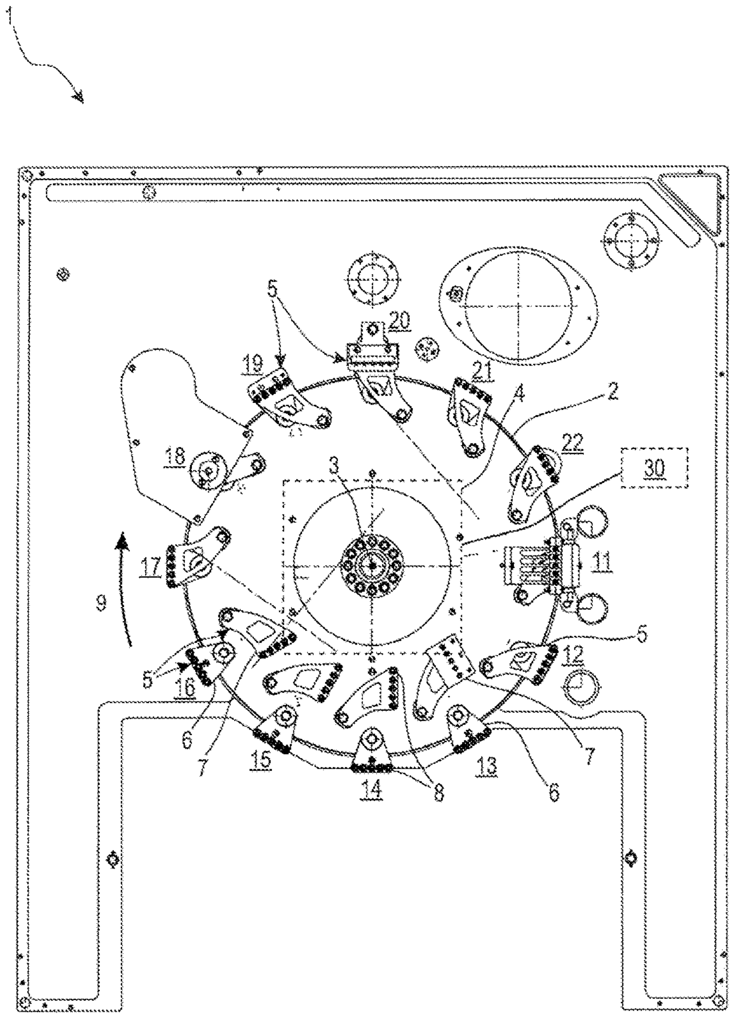
FIG. 1 shows a plan view of a capsule filling machine in an embodiment according to the disclosure with a rotary table and capsule segments arranged on the rotary table.

FIG. 1 shows a plan view of an embodiment of a capsule filling machine 1 according to the disclosure for filling capsules with a filling material. The filling material may be provided in the form of a powder, a granulate, tablets or the like. In this instance, it may be a pharmaceutical preparation, a food supplement or the like. The capsules include a lower capsule portion and an upper capsule portion which is placed thereon; both portions are produced, for example, from hard gelatine.

The capsule filling machine 1 according to FIG. 1 includes a rotary table 2 and a schematically illustrated main drive unit 4, wherein the rotary table 2 can be driven via the main drive unit 4 in rotation about a vertical rotation axis 3 in accordance with the rotation direction 9 in timed steps. The main drive unit 4 includes at least one electric motor which is operationally connected to the rotary table 2 and which drives it. Preferably, the capsule filling machine 1 can include a control unit 30 which is coupled to the main drive unit. The control unit 30 is also illustrated merely schematically in FIG. 1 with broken lines. A number of capsule segments 5 are arranged on a circumferential region of the rotary table 2 with uniform angular spacing. In the embodiment shown, a total of twelve capsule segments 5 are provided. A different number of capsule segments 5 may also be advantageous. Each capsule segment 5 includes a lower segment portion 6 which is securely fixed to the circumferential region of the rotary table 2 and an upper segment portion 7 which can be pivoted relative thereto. Around the rotary table 2 there are positioned a plurality of processing stations 11 to 22 which are fixed, that is, which do not also rotate with the rotary table 2, and which are not illustrated in detail in FIG. 1. The number of processing stations 11 to 22 corresponds to the number of capsule segments 5 so that, in each rotation position of the rotary table 2 which is timed in angular steps, each capsule segment 5 comes to rest in the access region of one of the processing stations 11 to 22 in each case.

In an embodiment, the capsule segments 5 contain a plurality of capsule receiving members 8 for receiving the capsules. In the preferred embodiment, each capsule segment 5 contains five capsule receiving members 8. It may be advantageous to also provide a plurality of capsule receiving members 8, in particular ten, preferably twelve capsule receiving members 8. The capsule receiving members 5 are in the preferred embodiment arranged in a linear, straight row. With a high number of capsule receiving members 5, these may also be arranged in two or more such rows.

The above embodiment of the capsule filling machine 1 includes an insertion station 11 in which initially provisionally assembled empty capsules including a lower capsule portion and upper capsule portion are inserted into the capsule receiving members 8 of the capsule segment 5. During normal operation, there is brought about a separation of the attached upper capsule portion from the lower capsule portion. The next processing station is a removal station 12. Defective empty capsules which have not been separated are removed in the removal station 12.

After the removal station 12, the upper segment portion 7 is pivoted with the upper capsule portions retained therein with respect to the lower segment portion 6 with the lower capsule portions retained therein. The lower segment portion 6 is guided on the filling stations, in this instance a total of three filling stations 13, 14, 15, which follow the removal station 12. In the filling stations 13, 14, 15, the lower capsule portions which are retained in the lower segment portions 6 are filled with the provided filling material. It may also be sufficient to provide only one or two filling stations.

After passing through the last filling station 15, the upper segment portion 7 is pivoted back via the stations 16, 17, 18 into the aligned position relative to the lower segment portion 6. In the closure station 18, the capsules are closed by the previously removed or separated upper capsule portions being pushed back onto the filled lower capsule portions and locked. The closure station 18 is adjoined by a plurality of control stations 19, 20. In the control stations 19, 20, capsules are examined and where applicable removed. In a following ejection station 21, the remaining capsules which have been found to be good are ejected via tappets which are not illustrated or other ejection means. Additional examinations of the capsules can also be carried out in the ejection station 21.

Figure 2:
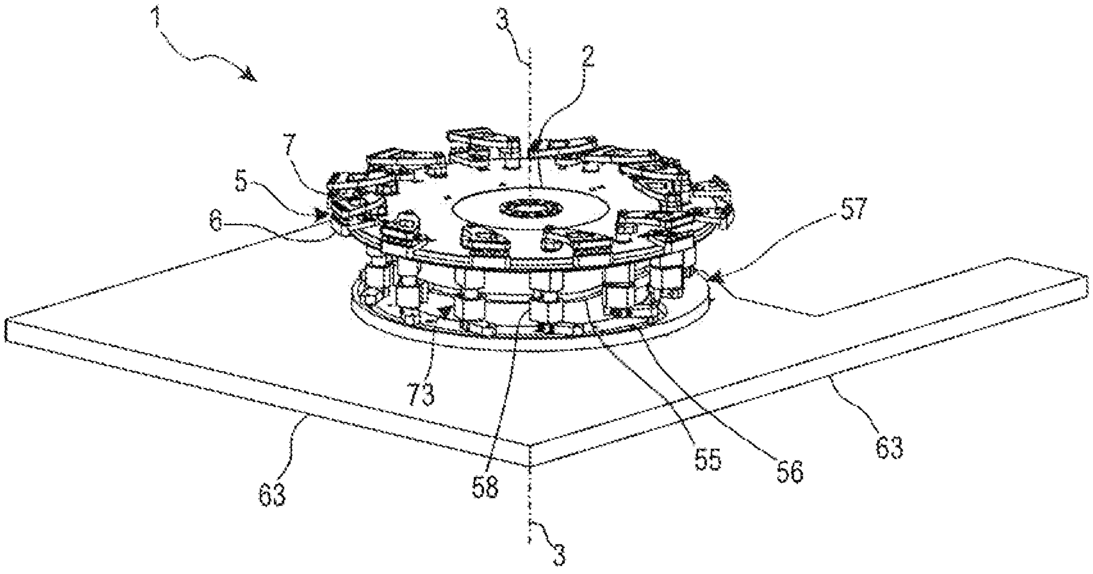
FIG. 2 shows a perspective illustration of the capsule filling machine without stations.

FIG. 2 shows the capsule filling machine 1 according to the disclosure in a perspective illustration without stations. The capsule filling machine 1 includes a base plate 63, to which a fixed housing portion 57 of the capsule filling machine 1 is secured (see also FIG. 4). The base plate 63 can preferably be secured to a table which is not illustrated. The fixed housing portion 57 is formed by a base portion 62, a cylindrical circumferential portion 61 and a covering portion 64. The fixed housing portion 57 is secured via the base portion 62 to the base plate 63. The base portion 62 is connected to the covering portion 64 via the circumferential portion 61. In the embodiment, the base portion 62 is in the form of a circular plate which extends with respect to the rotation axis 3 of the rotary table 2 in a radial direction. The cylindrical circumferential portion 61 is arranged with the longitudinal axis thereof coaxially with respect to the rotation axis 3 of the rotary table 2 and extends from the base portion 62 along the rotation axis 3 vertically upwards to the covering portion 64. Since the base portion protrudes radially with respect to the rotation axis 3 over the circumferential portion 61, the base portion 62 forms a collar 65 of the fixed housing portion 57.

Figure 4:
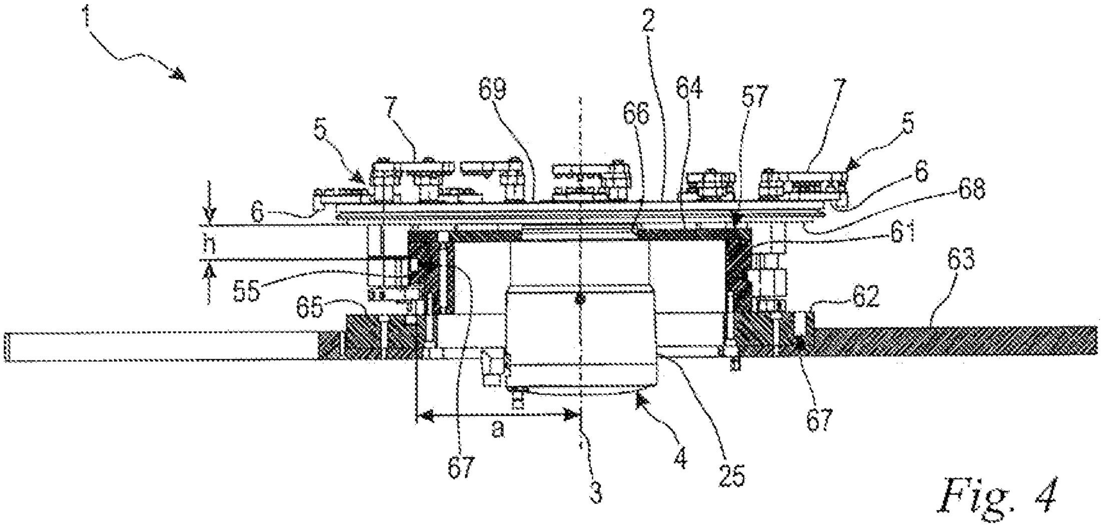
FIG. 4 shows a lateral sectioned illustration of the capsule filling machine according to FIG. 2; and, FIG. 5 shows a side view of the capsule filling machine according to FIG. 2.

As shown in particular in FIG. 4, the covering portion 64 adjoins the circumferential portion 61. In the embodiment, the covering portion 64 is in the form of a plate and at least partially closes the circumferential portion 61. The main drive unit 4 is secured to the covering portion 64 with the housing 25 thereof. In the covering portion 64 there is provided an opening 66 through which a drive shaft (not illustrated in greater detail) of the main drive unit 4 protrudes and is operationally connected to the rotary table 2 in order to drive the rotary table 2. The rotation axis of the drive shaft naturally corresponds to the rotation axis 3 of the rotary table 2.

As shown in particular in FIG. 4, the covering portion 64 adjoins the circumferential portion 64. In the embodiment, the covering portion 64 is in the form of a plate and at least partially closes the circumferential portion 61. The main drive unit 4 is secured to the covering portion 64 with the housing 25 thereof. In the covering portion 64 there is provided an opening 66 through which a drive shaft (not illustrated in greater detail) of the main drive unit 4 protrudes and is operationally connected to the rotary table 2 in order to drive the rotary table 2. The rotation axis of the drive shaft naturally corresponds to the rotation axis 3 of the rotary table 2.

As shown in FIG. 4, the base portion 62, circumferential portion 61 and covering portion 64 are each in the form of individual structural elements which are secured to each other via screw connections. The main drive unit 4 is arranged substantially inside the circumferential portion 61.

As shown in FIG. 2, the capsule segments 5 are arranged on the rotary table 2. In the embodiment, the lower segment portion 6 of each capsule segment 5 is securely connected to the rotary table 2. Accordingly, a relative movement between the rotary table 2 and the lower segment portion 6 is not possible. The upper segment portion 7 is in contrast movably retained on the rotary table 2 via a guiding arm 58. The guiding arm 58 is in this instance constructed in such a manner that a relative movement 51 (FIG. 3) is enabled between the upper segment portion 7 and the lower segment portion 6.

Figure 3:
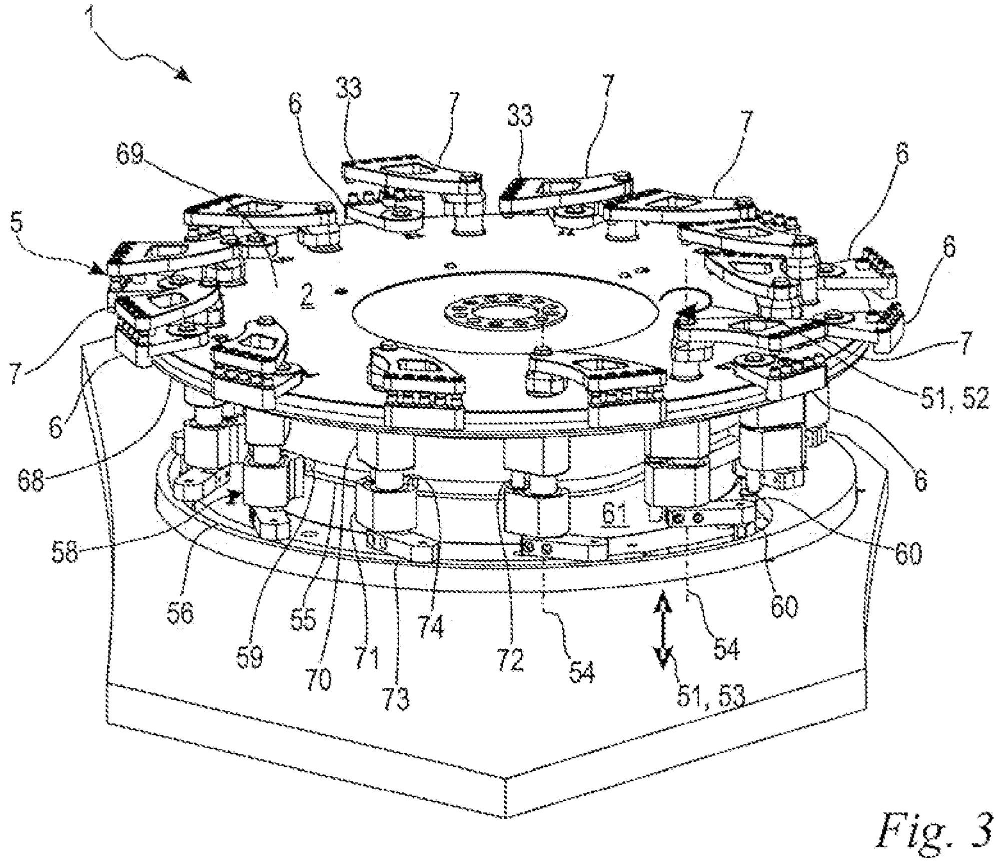
FIG. 3 shows a cut-out perspective view of the capsule filling machine according to FIG. 2.

As shown in FIGS. 2 and 3, a first slotted guiding member 55 and a second slotted guiding member 56 are formed on the fixed housing portion 57. The guiding arm 58 engages in the slotted guiding members 55, 56 so that the upper segment portion 7 is operationally connected to the slotted guiding members 55, 56 via the guiding arm 58. The slotted guiding members 55, 56 are constructed in such a manner that the upper segment portion 7 with respect to the lower segment portion 6 carries out a translational movement 53 and a pivot movement 52 (FIG. 3). The relative movement 51 between the lower segment portion 6 and the upper segment portion 7 brings about a release of the lower segment portion 7 in order to fill the capsules which are retained in the lower segment portion 6 with filling material. Accordingly, in order to guide the lower segment portion 6 and upper segment portion 7 apart and together again, no additional drive units are required in addition to the main drive unit 4.

FIG. 3 shows an enlarged, cut-out illustration of the capsule filling machine 1 according to FIG. 2. The first slotted guiding member 55 is formed on the circumferential portion 61 of the fixed housing portion 57. The first slotted guiding manner 55 is, as also shown in particular in FIG. 4, constructed in the embodiment as a groove 67. The first slotted guiding member 55 has a height h (FIG. 4), wherein the height h corresponds to the spacing between the first slotted guiding member 55 and the rotary table 2 as measured in the direction of the rotation axis 3 of the rotary table 2. The height h of the first slotted guiding member 55 changes along the circumference of the circumferential portion 61, whereby the translational movement 53 of the upper segment portion 7 is brought about.

As shown in FIGS. 3 and 4, the second slotted guiding member 56 is formed on the base portion 62, in particular on the collar 65 of the fixed housing portion 57. The second slotted guiding member 56 can preferably also be in the form of a groove 67 in the same manner as the first slotted guiding member 55. In an alternative embodiment of the capsule filling machine 1, it may be advantageous to also construct the slotted guiding member 55, 56 in the form of a slot or via corresponding projections on the fixed housing portion 57. The grooves 67 provided in the embodiment are in the form of rectangular grooves. Other cross sectional geometries may also be advantageous for the grooves 67. The second slotted guiding member 56 has a radial spacing a with respect to the rotation axis 3 of the rotary table 2. The spacing a of the second slotted guiding member 56 changes in a circumferential direction of the rotation axis 3, whereby the pivot movement 52 of the upper segment portion 7 is brought about.

The first slotted guiding member 55 and the second slotted guiding member extend in each case along the fixed housing portion 57 through an angle of 360° with respect to the rotation axis 3 of the rotary table 2. Consequently, the rotary table 2 can be rotated with the corresponding guiding arms 58 in a stop-free manner through more than 360° with respect to the fixed housing portion 57.

As shown in FIG. 3, the upper segment portion 7 includes the guiding arm 58. The guiding arm 58 is operationally connected to the first slotted guiding member 55 and the second slotted guiding member 56, whereby the guiding arm 58 brings about the pivot movement 52 and the translational movement of the upper segment portion 7. The guiding arm 58 includes a first connecting link element 59, wherein the first connecting link element 59 engages in the first slotted guiding member 55 on the fixed housing portion 57. The guiding arm 58 includes a second connecting link element 60, wherein the second connecting link element 60 engages in the second slotted guiding member 56 on the fixed housing portion 57. The connecting link elements 59, 60 can preferably be in the form of rollers in order to minimise the friction between the slotted guiding members 55, 56 and the connecting link elements 59, 60.

Figure 5:
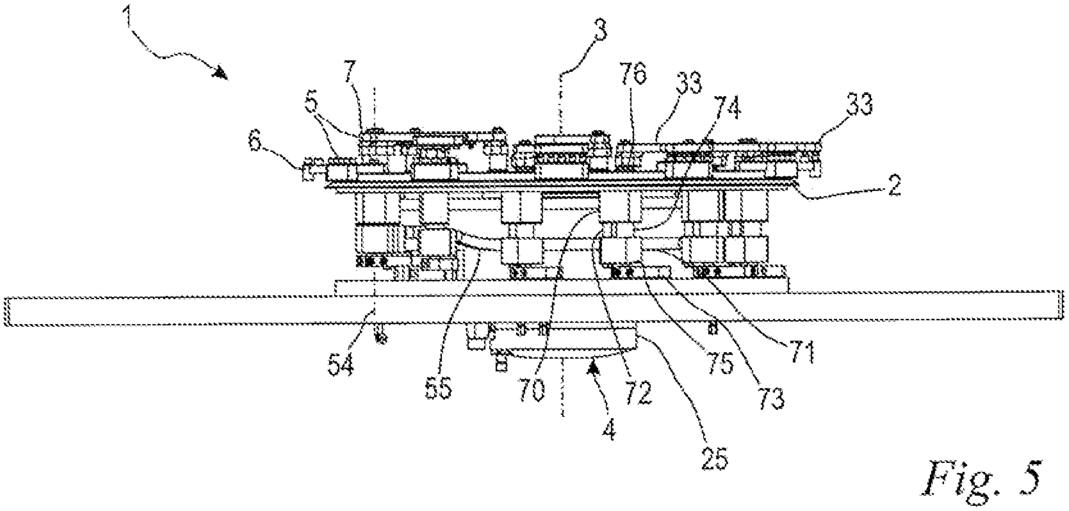

As shown in FIGS. 3 and 5, the guiding arm 58 further includes an upper portion 70, a lower portion 71, a linear guide 72, a pivot arm 73 and a connection shaft 74. The upper portion 70 is secured to the lower side 68 of the rotary table 2 facing the base plate 63. The lower portion 71 is connected to the upper portion 70 via the linear guide 72. In addition, the lower portion 71 is guided so as to be able to be moved in translation via the linear guide 72 with respect to the upper portion 70 in the direction of the rotation axis 3 of the rotary table 2. The connection shaft 74 has a first end 75 facing the base plate 63 and an end 76 facing away from the base plate 63. The pivot arm 73 is secured at the first end 75 of the connection shaft 74. Accordingly, the pivot arm 73 is securely connected to the connection shaft 74. The connection shaft 74 protrudes with the second end 76 thereof through the rotary table 2, wherein the upper capsule portion receiving member 33 is secured to the second end 76 of the connection shaft 74. Accordingly, the upper capsule portion receiving member 33 is also securely connected to the connection shaft 74. The connection shaft 74 has a pivot axis 54 which corresponds to the longitudinal center axis of the connection shaft 74. The connection shaft 74 is rotatably supported about the pivot axis 54. The pivot axis 54 can preferably be orientated parallel with the rotation axis 3 of the rotary table 2. The connection shaft 74 can preferably be radially supported on the upper portion 70. The connection shaft 74 can preferably be axially supported on the lower portion 71, in particular also radially supported. The first connecting link element 59 is arranged on the lower portion 71. The second connecting link element 60 is arranged at the end of the pivot arm 73 facing away from the connection shaft 74.

The relative movement 51 brought about by the slotted guiding members 55, 56 between the upper segment portion 7 and the lower segment portion 6 will be described below.

The upper segment portion 7 and the lower segment portion 6 overlap, as a result of which an upper capsule portion which is received in the upper segment portion 7 and a lower capsule portion which is received in the lower segment portion 6 are orientated coaxially with respect to each other. The rotary table 2 is rotated via the main drive unit 4 about the rotation axis 3. In this instance, the connecting link elements 59, 60 slide and/or roll along the corresponding slotted guiding members 55, 56. The height h of the first slotted guiding member 55 decreases, whereby the first connecting link element 59 via the lower portion 71 lifts the connection shaft 74 in the direction away from the base plate 63. In this instance, the upper capsule portion receiving member 33 is also raised and is arranged spaced apart from the lower segment portion 6. When the rotary table 2 is further rotated, the spacing a of the second slotted guiding member 56 is reduced. In this instance, the pivot arm 73 is rotated via the second connecting link element 60 which is operationally connected to the second slotted guiding member 56 about the pivot axis 54. The connection shaft 74 and the upper capsule portion receiving member 33 also rotate about the pivot axis 54 with the pivot arm 73. The upper segment portion 7 and the lower segment portion 6 no longer overlap. The lower segment portion 6 is released, whereby the lower capsule portions which are received in the lower segment portion 6 can be filled. According to the same principle, the upper segment portion 7 is pivoted back until it overlaps with the lower segment portion 6 again.

It is understood that the foregoing description is that of the preferred embodiments of the invention and that various changes and modifications may be made thereto without departing from the spirit and scope of the invention as defined in the appended claims.

What is claimed is:

1. A capsule filling machine for filling two-part capsules each having an upper capsule portion and a lower capsule portion, the capsule filling machine comprising:

a main drive unit for operating the capsule filling machine;

at least one capsule segment for conveying the capsules;

said at least one capsule segment including a lower segment portion configured to receive the lower capsule portion and an upper segment portion configured to receive the upper capsule portion;

said lower segment portion and said upper segment portion being configured to be moveable relative to each other; and, said at least one capsule segment being operatively connected to said main drive unit such that a relative movement of said lower segment portion and said upper segment portion with respect to each other is effected by the main drive unit;

wherein the relative movement includes a pivot movement about a pivot axis of said at least one capsule segment and a translational movement in a direction of the pivot axis; and a first slotted guiding member configured to, together with said main drive unit, effect the translational movement of said at least one capsule segment.

2. The capsule filling machine of claim 1, wherein said upper segment portion is configured to be pivotably driven about a pivot axis via said main drive unit.

3. The capsule filling machine of claim 1, wherein said upper segment portion is configured to be driven via said main drive unit so as to be able to be moved in translation along a pivot axis of said at least one capsule segment.

4. The capsule filling machine of claim 1 further comprising:

a second slotted guiding member configured to, together with said main drive unit, effect the pivot movement of said at least one capsule segment; and, said first slotted guiding member and said second slotted guiding member being formed on a fixed housing portion of the capsule filling machine.

5. The capsule filling machine of claim 1 further comprising a rotary table configured to be rotatingly driven via said main drive unit about a rotation axis of said rotary table.

6. The capsule filling machine of claim 5, wherein said lower segment portion is securely connected to said rotary table.

7. A capsule filling machine for filling two-part capsules each having an upper capsule portion and a lower capsule portion, the capsule filling machine comprising:

a main drive unit for operating the capsule filling machine;

at least one capsule segment for conveying the capsules;

said at least one capsule segment including a lower segment portion configured to receive the lower capsule portion and an upper segment portion configured to receive the upper capsule portion;

said lower segment portion and said upper segment portion being configured to be moveable relative to each other; and, said at least one capsule segment being operatively connected to said main drive unit such that a relative movement of said lower segment portion and said upper segment portion with respect to each other is effected by the main drive unit;

wherein the relative movement includes a pivot movement about a pivot axis of said at least one capsule segment and a translational movement in a direction of the pivot axis; and, a second slotted guiding member configured to, together with said main drive unit, effect the pivot movement of said at least one capsule segment.

8. A capsule filling machine for filling two-part capsules each having an upper capsule portion and a lower capsule portion, the capsule filling machine comprising:

a main drive unit for operating the capsule filling machine;

at least one capsule segment for conveying the capsules;

said at least one capsule segment including a lower segment portion configured to receive the lower capsule portion and an upper segment portion configured to receive the upper capsule portion;

said lower segment portion and said upper segment portion being configured to be moveable relative to each other; and, said at least one capsule segment being operatively connected to said main drive unit such that a relative movement of said lower segment portion and said upper segment portion with respect to each other is effected by the main drive unit;

wherein the relative movement includes a pivot movement about a pivot axis of said at least one capsule segment and a translational movement in a direction of the pivot axis;

a first slotted guiding member configured to, together with said main drive unit, effect the translational movement of said capsule segment;

a second slotted guiding member being configured to, together with said main drive unit, effect the pivot movement of said at least one capsule segment;

said at least one capsule segment having a guiding arm;

said guiding arm including a first connecting link element and a second connecting link element; and, said first connecting link element being configured to cooperate with said first slotted guiding member and said second connecting link element being configured to cooperate with said second slotted guiding member.

* * * * *